Figure 1:
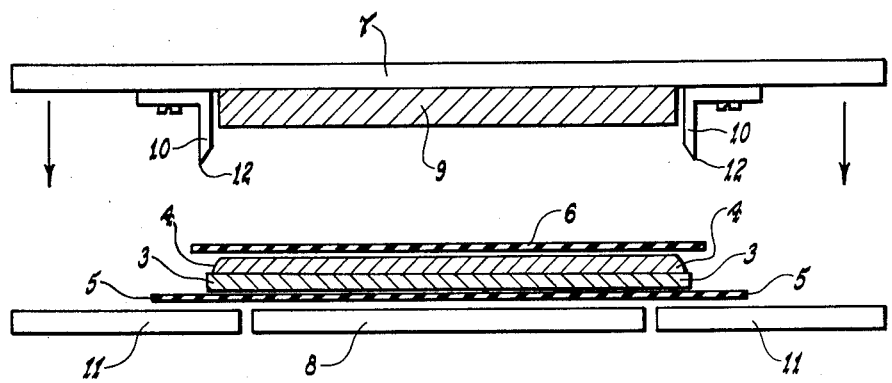

Feb. 8, 1966 G. SMITH 3,234,064
METHOD OF FORMING A COMPOSITE SANDWICH TYPE PANEL
Filed June 10, 1963

INVENTOR
GEORGE SMITH
Imirie & Smiley
Attys.

United States Patent Office 3,234,064
Patented Feb. 8, 1966

3,234,064
METHOD OF FORMING A COMPOSITE SANDWICH TYPE PANEL
George Smith, Toorak, Victoria, Australia, assignor to Motor Trims Pty. Ltd., Prahran, Victoria, Australia, a corporation of Victoria, Australia
Filed June 10, 1963, Ser. No. 286,739
Claims priority, application Australia, June 20, 1962, 19,110/62
1 Claim. (Cl. 156—222)

This invention relates to panels of the kind made up of a hardboard or like base panel covered on one side by a sheet of wool substance, plastic or other suitable "riser" material, such panels being used, for example, for lining the interior portions of motorcar doors and the like.

It is known to provide for these purposes a hardboard panel of the desired shape covered by a sheet of "riser" material which may be a wool substance or a plastic material such as polyvinyl chloride (P.V.C.) or polyurethane. The base panel and sheet of riser material are cut to the required shape and size by any appropriate means, and the riser material embossed with the pattern prescribed by the customer. This embossing is usually carried out in a high-frequency dielectric welder. The covering sheet of riser material is prepared for application to the base panel e.g. by suitably shaping its periphery to facilitate folding around the curved marginal edge of the panel. This marginal edge, and preferably also that of the covering sheet, are given a coating of contact adhesive, for example by spraying or brushing, the adhesive being permitted to dry to a "tacky" consistency, whereupon the sheet of riser material is stretched and folded around the marginal edge of the base panel. Retaining staples are usually applied around the folded portion of the sheet and more especially where it covers corners or other portions of relatively large curvature in the edge of the base panel, and excess adhesive removed. The panel is then complete and ready for use.

In the prior method described above, great care must be taken to prevent the riser material from being impregnated with adhesive, as this tends to cause blisters and distortion in the completed panel. Great care must also be shown during the stretching and folding of the covering sheet to avoid stress marks, creases and the like. The above procedure also suffers from the disadvantage that the panels must be allowed to dry after application of adhesive, and the wet or "tacky" state of the adhesive poses substantial storage problems.

The primary object of this invention is to provide for manufacturing panels of the kind indicated by a substantially simplified process which does not suffer from the above shortcomings.

The above and other objects and advantages will become apparent hereinafter.

According to the present invention, the panel is produced by cutting the materials to the required size, and placing below the base panel a sheet of plastic or like material adapted to provide a certain amount of "overlap" or excess under the edge of the base panel, embossing the riser material to the pattern desired, trimming the edge of the riser material, if necessary, whereupon the base panel and covering sheet of riser material are placed in registration and welded by a known "tear-off" welding process following which the surplus margin of material may be torn off around the edge of the base panel. The "tear-off" welding may be carried out using a die of quasi-cutting design having a relatively sharp edge in lieu of the flat surface generally employed in high-frequency plastic welding.

Figure 2:
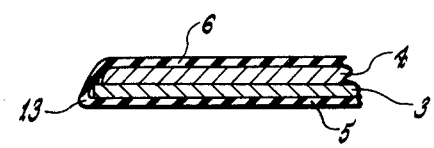

But in order that the invention may be better understood, reference will now be made to the accompanying drawing which is to be considered as part of this specification and read herewith. In the drawing:

FIGURE 1 is an elevation illustrating a preliminary stage in the process of the invention, with the materials in position ready for welding between the dies of a "tear-off" dielectric welding apparatus, and FIGURE 2 is a section showing the edge portion of a completed composite panel after welding of the materials illustrated in FIGURE 1 and removal of any surplus marginal plastic sheeting.

Referring more particularly to FIGURE 1, the base panel 3 is formed of hardboard or any other suitable material cut to the appropriate size and shape, and is covered by a layer 4 of "riser" material which may advantageously be of wool or like fibrous substance. The base panel 3 is susperposed over a sheet 5 of polyvinyl chloride, polyurethane or other suitable plastic material which "overlaps" the edge of the base panel 3 to provide a margin of plastic material preferably about 2" in breadth, around the entire periphery of the panel.

Another sheet 6 of plastic, which may be of the same composition as sheet 5, is placed over the riser material 4 so as also to leave an overlapping margin of width, for example, about 1" around the entire circumference. It will be appreciated that the shape of plan formation of the materials 3, 4, 5 and 6 and hence of the composite panel produced therefrom, will depend entirely upon the purpose for which it is required. For example, if the resulting panel or "trim" is for lining the front door of a motorcar, the shape will generally be substantially different from the design required for a rear door trim.

If desired, the plastic material 6 need not cover the whole of the top surface of the fibrous substance 4, but may be confined to covering a portion around the periphery thereof, such as by adhesively securing strips of plastic sheeting around a peripheral portion of the top surface of layer 4. The strips could, for example, be about 2" wide, one inch of which could provide the necessary overlap.

The materials 3, 4, 5 and 6 are placed between upper and lower dies, indicated generally by 7 and 8 respectively, of a "tear-off" dielectric welding apparatus to which is applied a high frequency E.M.F. alternating, for example, at a frequency between 12 and 21 megacycles per second, preferably at about 18.5 mcs./sec. It may be found that the actual frequency required will depend, inter alia, upon the kind of plastic material or materials used for layers 5 and 6.

The upper die may include an electrode base 7 fitted with independent electrodes 9 and 10 to be described more fully hereinafter, and the lower die may include a base electrode 8 and an outer electrode 11 cooperable with electrodes 9 and 10 respectively of the upper assembly 7.

The die assemblies denoted generally by 7 and 8 are mounted so as to be capable of approaching one another to such a minimum spacing that there is negligible risk of sparking between the respective electrodes of opposite (instantaneous) polarity. If desired, the lower assembly 8 may be fixed, and the upper assembly 7 capable of being lowered, preferably by an automatic mechanism which controls to fine tolerances the minimum permitted spacing between the opposed electrodes, and the time for which this minimum spacing is to be maintained.

The central electrode 9 of the upper die assembly may have its lower surface appropriately shaped, for example by projections 9', to emboss a pattern on the plastic or fibrous material when the upper assembly is lowered to a welding relationship with the lower. The outer electrode 10 is advantageously provided with a downwardly facing, continuous edge 12 of quasi-cutting configuration and of shape substantially identical with the contour of the finished composite panel desired.

Upon application of the high-frequency alternating voltage to the apparatus, and upon approach of the opposed electrodes, the molecular structure of the plastic sheets in those overlapping portions which come into close proximity with the edge 12, is known to be violently agitated resulting in a bonding action, giving the structure sectionally illustrated in FIGURE 2. Excess material outside the continuous joint 13 thus formed may readily be torn away leaving a panel or "trim" of neat, finished appearance. It will be evident that a "false" weld line may be incorporated inside the tear seal to achieve an effect similar to plastic piping or beading.

It will be apparent from the foregoing that the process of the present invention provides a substantially simpler and more convenient way of manufacturing panels than has obtained hitherto, and in particular, does not require any stretching or folding of the covering material which operation is generally found to be the slowest and most difficult step in known methods.

Furthermore, the present invention makes unnecessary any tensioning of the covering material which has hitherto usually of necessity been carried out by hand. This tensioning process has been found to be quite critical, requires a fairly high degree of skill, and has often resulted in a relatively large proportion of panels which have to be rejected.

The composite panels or "trims" provided by this invention present a flush appearance, thus substantially reducing draught and similar problems in vehicles in which they are used.

In addition, the present invention obviates the risk of blistering or distortion in the panel since no adhesive is required. The absence of adhesive also eliminates storage problems encountered hitherto in the necessary drying stage.

Having now described my invention, what I claim as new and desire to secure by Letters Patent is:

A method of forming a composite sandwich type panel of the type described comprising the steps of forming a first rigid panel in a desired shape and size, said first panel having opposing surfaces; forming a first covering sheet of high-frequency weldable thermo-plastic material of a shape complementing the shape of the first panel and of a size so that it has a cross-sectional area slightly greater than the cross-sectional area of the first panel; superimposing the first panel on the first covering sheet so that one surface thereof lies flat on the first covering sheet with the marginal edge portions of the first covering sheet extending beyond the peripheral edges of the first panel; forming a second substantially rigid panel of a shape and size substantially complemental to the shape and size of the first panel and superimposing said second panel on the other surface of the first panel; forming a second covering sheet of high-frequency weldable thermo-plastic material of a shape complementary to the shapes of the first and second panels and of a size so that it has a cross-sectional area greater than that of the panels with the second covering sheet having marginal edge portions of a width substantially equal to the combined thickness of the panels; folding said marginal edge portions of the second covering sheet into contact with the marginal edge portions of the first covering sheet so that the peripheral edges of the panels are completely covered and consequent therewith welding the contacting portions of the marginal edge portions of the covering sheets together by high-frequency welding, the welding being carried out around and close to the peripheral edges of the panels to produce a continuous joint; simultaneously embossing by high-frequency welding a design of the desired configuration through the second covering sheet and second panel onto the said other surface of the first panel; and tearing off any surplus material of the marginal edge portions of the covering sheets outwardly beyond the periphery weld thereby leaving a clean finished appearance with the peripheral edges of the panels completely enclosed and covered.

References Cited by the Examiner

UNITED STATES PATENTS

| | | | |
|---|---|---|---|
| 2,631,646 | 3/1953 | Gannon et al. | 156—380 |
| 3,026,233 | 3/1962 | Scholl et al. | 156—515 |
| 3,047,451 | 7/1962 | Beck et al. | 156—273 |
| 3,088,860 | 5/1963 | Scholl | 156—273 |
| 3,099,596 | 7/1963 | Prew | 156—380 |

FOREIGN PATENTS 658,244  10/1951  Great Britain.

EARL M. BERGERT, *Primary Examiner.*

DOUGLAS J. DRUMMOND, *Examiner.*